(12) United States Patent
Malwitz

(10) Patent No.: US 6,271,275 B1
(45) Date of Patent: *Aug. 7, 2001

(54) METHOD AND APPARATUS FOR PRODUCING POLYURETHANE FOAM

(75) Inventor: Nelson E. Malwitz, Brookfield, CT (US)

(73) Assignee: Sealed Air Corp. (US), Saddlebrook, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,100

(22) Filed: Aug. 17, 1998

(51) Int. Cl.⁷ ........................................ C08J 9/12
(52) U.S. Cl. ..................... 521/133; 521/130; 521/155
(58) Field of Search ..................... 521/155, 130, 521/133

(56) References Cited

U.S. PATENT DOCUMENTS

| | | |
|---|---|---|
| 2,236,551 | 4/1941 | Striegel . |
| 3,541,023 * | 11/1970 | Cole, III . |
| 3,773,298 | 11/1973 | Gebert . |
| 3,821,130 * | 6/1974 | Barron et al. . |
| 3,862,879 | 1/1975 | Barron et al. . |
| 3,882,052 | 5/1975 | Raynor et al. . |
| 3,936,036 | 2/1976 | Fries . |
| 4,191,480 | 3/1980 | Hiorth . |
| 4,275,172 | 6/1981 | Barth et al. . |
| 4,302,550 | 11/1981 | Pisaric et al. . |
| 4,430,446 | 2/1984 | Lynn . |
| 4,462,543 | 7/1984 | Yam . |
| 4,757,096 | 7/1988 | Berthevas et al. . |
| 4,783,295 | 11/1988 | Kearns et al. . |
| 4,863,276 | 9/1989 | Kennedy et al. . |
| 5,011,293 | 4/1991 | Roop et al. . |
| 5,055,272 | 10/1991 | Wheeler et al. . |
| 5,264,464 | 11/1993 | Wishneski et al. . |
| 5,328,938 | 7/1994 | Wishneski et al. . |
| 5,335,483 | 8/1994 | Gavronsky et al. . |
| 5,447,567 | 9/1995 | Tanaka et al. . |
| 5,472,990 | 12/1995 | Craig et al. . |
| 5,507,573 | 4/1996 | Hiorth . |
| 5,604,267 | 2/1997 | Duffy . |
| 5,727,370 | 3/1998 | Sperry ..................................... 53/472 |

* cited by examiner

Primary Examiner—John M. Cooney, Jr.
(74) Attorney, Agent, or Firm—Thomas C. Lagaly

(57) ABSTRACT

A method and apparatus are disclosed for producing polyurethane foam without the assistance of any through-flow mixing device for the precursor components. Air or other safe gas is mixed with a polyol-containing precursor to form a froth, and the froth is directed in a stream via a dispenser into a free space at a first predetermined rate of flow. Liquid isocyanate-containing precursor is directed in a stream via a dispenser at a second predetermined rate of flow into the free space so as to contact and mingle with the stream of froth. The mixed components then fall together into a container where they react to form polyurethane foam. Mixing of the streams is facilitated by a target upon which the two streams impinge in close proximity to each other.

18 Claims, 3 Drawing Sheets

METHOD AND APPARATUS FOR PRODUCING POLYURETHANE FOAM

FIELD OF THE INVENTION

The invention relates to the production of polyurethane foam and, more particularly, to methods and apparatus for on-site production of polyurethane foam having application in packaging and other industries.

BACKGROUND OF THE INVENTION

Polyurethane foams are widely used in a variety of applications, including the packaging industry, in which polyurethane foams are used for cushioning fragile articles for shipping and handling. Various processes for producing polyurethane foams are known in the art. In general, a polyol-containing precursor and an isocyanate-containing precursor are brought together and mixed in the presence of a catalyst to cause a reaction which leads to curing and solidification of the mixture. A gas is introduced into the mixture prior to solidification so that foaming of the mixture occurs.

A desirable objective in mixing the precursors is to achieve sufficient mixing so that the resultant polyurethane foam is substantially uniform and has the desired density for the intended application. Chemical and/or mechanical mixing techniques have been used for aiding the mixing of the polyol and isocyanate precursors. For instance, chemical blowing agents such as hydrocarbons, fluorocarbons, chlorofluorocarbons, and the like, have been used for introducing gas into the precursors to promote a foaming action which also facilitates mixing of the components. However, such chemical agents are costly, and some pose environmental and health hazards.

Consequently, mechanical mixing techniques have been developed for introducing gas into the precursors and for mixing the two precursors. For example, U.S. Pat. No. 5,472,990, issued to Craig et al., describes a method of producing polyurethane foam in which a polyol precursor is mixed with air in a dynamic mixer, and the polyol/air compound is then mixed with an isocyanate precursor in a static mixer. The mixture is discharged from the exit of the static mixer into the workpiece or site where polyurethane foam is needed.

Processes such as the one described in the Craig patent are effective for producing uniform polyurethane foams. However, a major drawback to all such processes in which the two precursors are mixed within a through-flow device, such as a dynamic or static mixer, is that polyurethane begins to form instantly inside the device as the two components mix and begin to react. As a result, unless steps are taken to prevent build-up of polyurethane within the mixing device, the device will eventually become clogged and will cease to function properly. This build-up of polyurethane is conventionally overcome by frequent maintenance of the mixing devices to keep them unclogged and working, including flushing of the devices with a solvent to dissolve the polyurethane deposits from the insides of the devices. However, these maintenance and flushing procedures take time away from more-productive activities. Additionally, the flushing systems add electromechanical complexity and, consequently, add to the cost of a dispensing system with no corresponding gain in efficiency or usefulness. Furthermore, the solvents are costly, and their use and disposal can pose health and environmental problems.

Thus, there has been a need for a method of producing polyurethane foam in which hazardous mixing agents and/or solvents are not required, and which alleviates the problem of mixing devices being clogged by polyurethane deposits.

SUMMARY OF THE INVENTION

In contrast to the prior methods employing mixing chambers as noted above, the present invention provides methods and apparatus for producing polyurethane foam in which the precursors are mixed without the assistance of any mixing chamber or other through-flow device that might become clogged over time. Furthermore, the methods and apparatus of the invention do not require the use of any hazardous chemical mixing agents or solvents.

To these ends, a preferred embodiment of a method in accordance with the invention comprises dispersing bubbles of a gas in a first liquid precursor to form a froth, directing a stream of the froth into a free space at a first predetermined rate of flow, and directing a stream of a second precursor at a second predetermined rate of flow into the free space so as to contact and mingle with the stream of froth, whereby the two precursors mix without the assistance of a through-flow mixing chamber or device and react to form a polyurethane foam.

The gas is preferably air, although carbon dioxide, nitrogen, or any other safe gas may be used. The first precursor which is frothed preferably comprises a polyol-containing precursor (also referred to herein as a "B" component), and the second precursor preferably comprises an isocyanate-containing precursor (also referred to herein as an "A" component). Alternatively, however, the "A" component may be frothed and the "B" component mixed in liquid form with the frothed "A" component. Furthermore, another alternative is to froth both the "A" and "B" components and mix the two froth streams. The invention takes advantage of the finding that a polyol-containing precursor readily mixes sufficiently with an isocyanate-containing precursor to produce a substantially uniform polyurethane foam, without mechanical intervention and without any substantial impingement forces needing to be exerted, as long as one or both of the precursors is formed into a froth prior to being mixed with the other precursor.

In accordance with one embodiment of the invention, the two streams of precursors are directed against a target so as to impinge on the target in close proximity to each other. The precursors then fall together under the influence of gravity and mix as they fall. The streams may be directed to impinge on opposite sides of the target or on the same side of the target. After impingement, the precursors may fall into an open container for foam-in-place packaging, into a mold to produce a shaped article, into a bag to be used as a cushioning device, or into any other site where polyurethane foam is needed.

Various techniques may be employed for generating the froth of the first precursor. In accordance with one preferred embodiment of the invention, bubbles of a gas such as air are introduced into the first precursor within a through-flow device to form a froth, and the froth is then dispensed through a nozzle into the free space to contact and mingle with the second precursor. Advantageously, the liquid first precursor is passed over a porous sintered member through which a gas such as air is passed. The sintered element creates air bubbles which are entrained in the liquid precursor flowing over the sintered member. Thus, froth is created on an as-needed basis. The sintered member advantageously can be incorporated into the dispenser which directs the froth into the free space, so that froth is created immediately upstream of the dispenser exit. Thus, the froth is created on demand and virtually all of the froth that is created is used immediately. Therefore, there is substantially no inventory of froth created which can decay back into liquid form.

However, other techniques for generating the froth can be used. For instance, in another preferred embodiment of the invention, polyol-containing "B" component is heated to about 55°–85° C. and is supplied under pressure to a dispenser, from which the heated "B" component is dispensed into the free space. Air which is naturally dissolved in the "B" component is liberated as the pressure of the "B" component drops to atmospheric pressure at the exit of the dispenser nozzle, and the liberated air forms air bubbles in the "B" component, thus creating a froth.

The invention thus provides methods and apparatus for producing polyurethane foam without costly and hazardous chemical agents and solvents, and without the need for mixing the precursors within any permanent through-flow mixing device. Additionally, it has been found that the process is operable over a wide range of flow rates, in contrast to processes employing a static mixer which typically is tuned for a particular flow rate and suffers performance degradation when the flow rate substantially deviates from the design rate.

BRIEF DESCRIPTION OF THE DRAWINGS

Further features, objects, and advantages of the invention will become apparent from the following detailed description of specific embodiments thereof when taken in conjunction with the accompanying drawings, in which.

DESCRIPTION OF THE PREFERRED EMBODIMENTS

The present invention is described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout the drawings.

Figure 1:
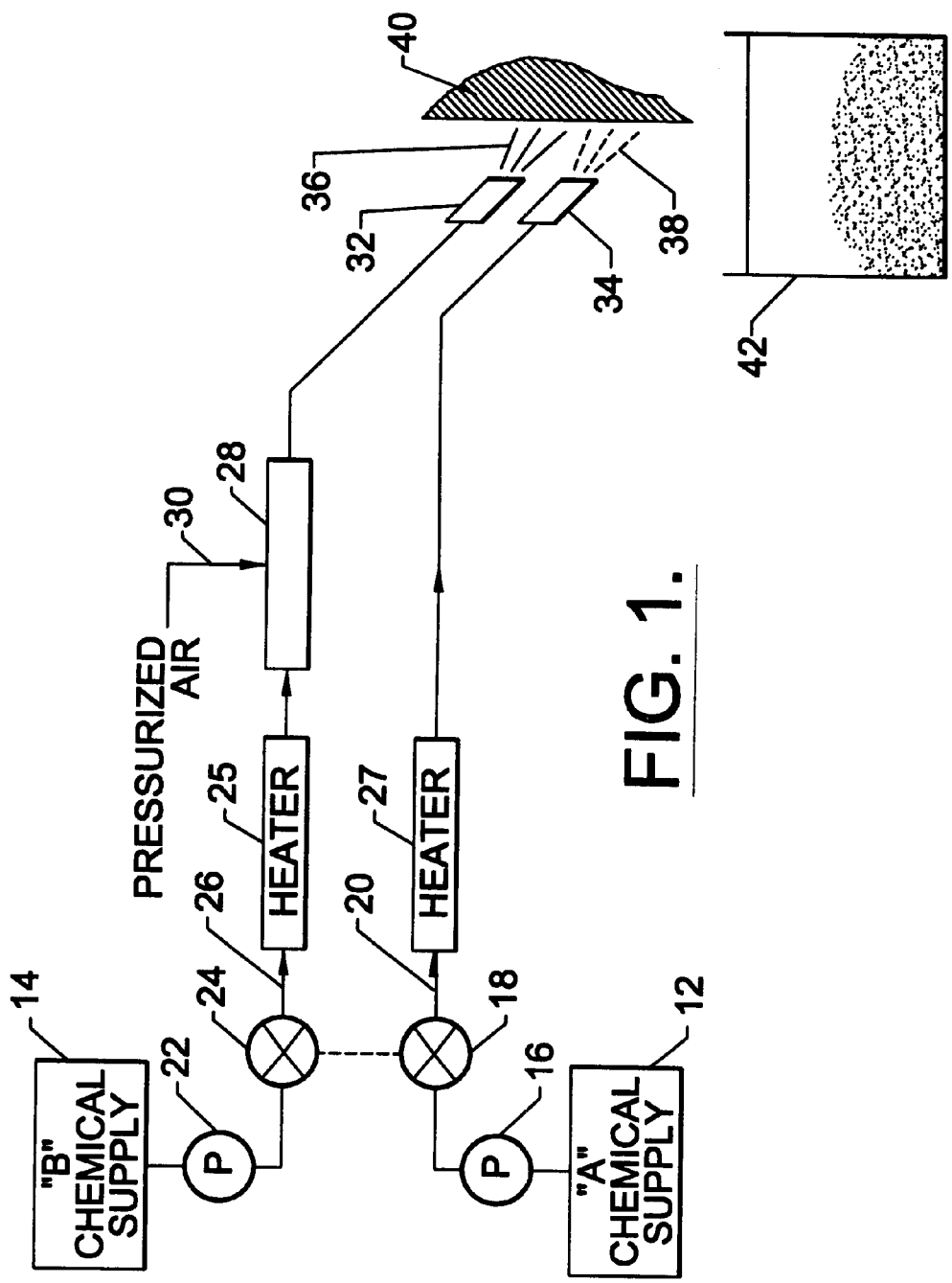
FIG. 1 is a schematic depiction of an apparatus for producing polyurethane foam in accordance with the principles of the invention.

With reference to FIG. 1, an apparatus 10 for producing polyurethane foam in accordance with the invention is depicted in schematic form. The apparatus 10 includes a tank or vessel 12 which is adapted to contain a liquid isocyanate-containing precursor or "A" component, and a tank or vessel 14 which is adapted to contain a liquid polyol-containing precursor or "B" component. A pump 16 pumps "A" component from the vessel 12 to a metering device 18, which discharges liquid "A" component through a line 20 at a predetermined rate of flow. Any suitable metering device can be used for the purpose, such as a positive displacement metering gear pump.

A pump 22 pumps "B" component from the vessel 14 to a metering device 24, which discharges liquid "B" component through a line 26 at a predetermined rate of flow. The flow rates of the "A" and "B" components are selected to be in the same ratio as the desired ratio of "A" and "B" components in a final mixture of the two components when they are mixed and reacted to produce a polyurethane foam.

The "A " component preferably is heated by a heater 25 to a predetermined temperature, and likewise, the "B" component preferably is heated by a heater 27 to a predetermined temperature. The temperature of the precursors affects the speed of the foam-forming reaction when the precursors are mixed, and also affects the quality of the resulting foam in terms of color, uniformity of cell size, and density. Preferably, for making urethane foam for packaging purposes, the precursors are heated by the heaters 25 and 27 to a temperature of about 20–85° C., and more preferably, to a temperature of about 55–65° C.

After being heated, the "B" component is supplied to a froth-generating device 28. The froth-generating device 28 also receives pressurized gas from a suitable source, as indicated at 30, and mixes the gas and "B" component to form a froth having a consistency similar to shaving cream. Air is the preferred gas, but other safe gases such as nitrogen and carbon dioxide can be used.

For making polyurethane foam for packaging purposes, foam having relatively low density (for example, about 0.005 to about 0.015 g/cm$^3$) is desirable. It is also desirable that the foam cell sizes be substantially uniform throughout the foam, and that the foam have a substantially white color rather than a yellow color. To achieve foam having such qualities, it is preferred to mix air into the "B" component such that the void fraction of the resulting froth is about 6 percent to about 16 percent, and more preferably about 10–14 percent, with average bubble diameters of about 20-40 micron.

The froth is discharged from the froth-generating device 28 to a dispenser 32. The "A" component is supplied from the heater 27 in liquid form to a second dispenser 34. The dispensers 32 and 34 are arranged to dispense streams of "B" froth 36 and "A" liquid 38, respectively, into a free space and against a target 40. The target 40 may be a rigid plate or a flexible sheet of plastic, paper, or other material. The dispensers 32 and 34 are oriented so that the two streams 36 and 38 impinge on the target 40 in close proximity to each other, and preferably so that the two streams converge as they strike the target. The streams mingle upon impingement and then fall together under the influence of gravity into an open container 42 or other site where polyurethane foam is needed. The container 42 may be a shipping container where foam-in-place packaging is needed, a mold for producing a shaped foam article, a bag to be used as a cushion, or the like.

As known in the art of foam-in-place packaging, the dispensers 32 and 34 include valves (not shown) for alternately dispensing and interrupting the streams 36 and 38 of precursor components. The dispensers may be of any suitable type as long as they are capable of producing controlled streams at the desired flow rates of the two components. The ratio of the flow rates of the liquid "A" and "B", however, must be maintained within close tolerance of the desired ratio of "A" and "B" components in the final mixture which is to be reacted to produce polyurethane foam, as is well known in the art.

For example, in accordance with a preferred embodiment of the invention, liquid "A" component is dispensed at a mass flow rate of about 1.7–5.7 $lb_m$/min, and frothed "B" component is dispensed at a mass flow rate of about 1.3–4.3 $lb_m$/min, such that the total mass flow rate is about 3–10 $lb_m$/min and the ratio of "A" to "B" is about 1.35. Using the methods and apparatus of the invention, high-quality foams are manufacturable over this relatively wide range of total flow rate as long as the void fraction of the frothed "B" component is kept within the range of about 10–14 percent and the temperature of the precursors just prior to mixing is at least about 55° C. Furthermore, the "A" component preferably contains a small amount of a silicone surfactant, for example about 1–3 percent by weight, to aid in promoting uniformity of cell size.

Figure 2:
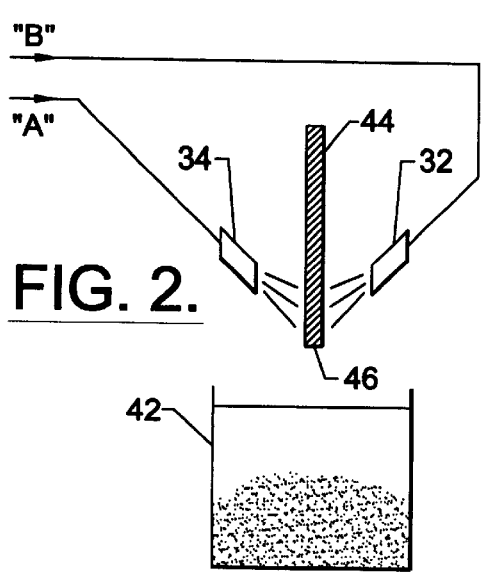
FIG. 2 is a schematic depiction of an alternative embodiment of an apparatus for producing polyurethane foam in accordance with the invention.

Various arrangements of the dispensers and the target can be used. For instance, FIG. 2 depicts an alternative embodiment of the invention in which the dispensers 32 and 34 are arranged on opposite sides of a target 44, and are oriented to impinge on the target 44 on opposite sides thereof adjacent its lower edge 46. The precursors flow down to the lower edge of the target and fall under the influence of gravity into the container 42. As they converge upon and fall from the lower edge 46 of the target 44, the precursors mix to form a foam-forming composition.

Figure 3:
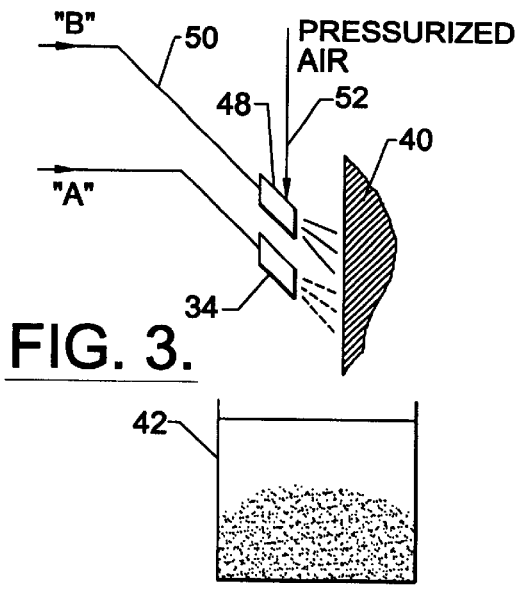
FIG. 3 is a schematic depiction of yet another embodiment of an apparatus in accordance with the invention.
Figure 4:
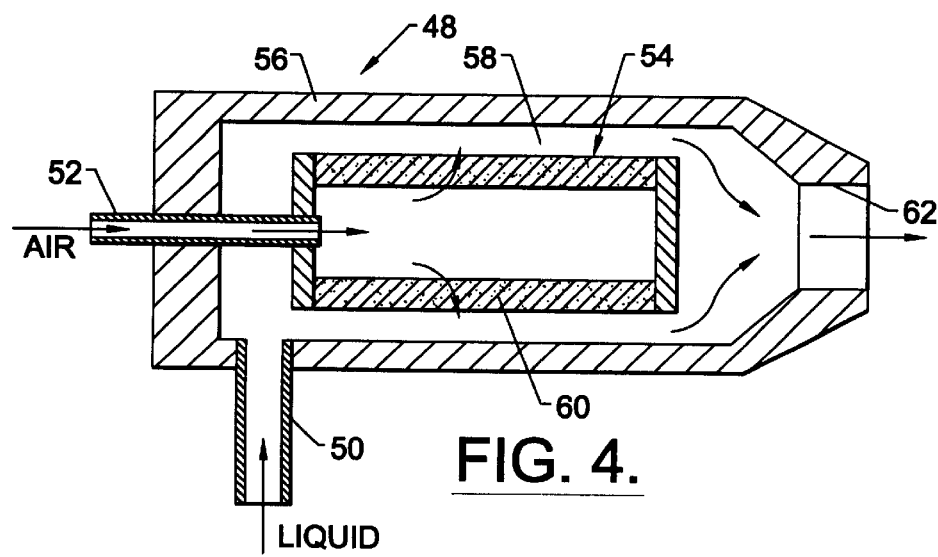
FIG. 4 is a cross-sectional view of a froth-generating device suitable for use with the methods and apparatus of the invention.

Froth that is generated but not dispensed from the "B" dispenser will eventually decay back to a liquid and, if not purged from the flow passage in which it resides, will be dispensed as a liquid when the subsequent dispensing operation is commenced. Since this is undesirable, particularly if a large inventory of froth decays back to liquid and is subsequently dispensed, it is preferable to immediately dispense as much as possible of the "B" froth that is generated. To this end, FIG. 3 depicts a further embodiment of the invention in which the "B" froth is created within the "B" dispenser itself, immediately upstream of the dispenser exit, and FIG. 4 depicts in greater detail one preferred embodiment of a "B" dispenser suitable for making and immediately dispensing froth. The "B" dispenser 48 receives liquid "B" component via a line 50, and also receives pressurized air through a line 52. The air and "B" component are mixed within the dispenser 48 and immediately discharged as a froth stream. The advantage of this arrangement is that virtually all of the froth that is created is immediately used, so that substantially no inventory of froth is created which can decay back to liquid form and subsequently be dispensed from the dispenser.

More particularly, with reference to FIG. 4, the "B" froth is preferably created by adding air to the liquid "B" component via a hollow cylindrical sintered element 54 which resides within a housing 56 of the dispenser 48. The sintered element may be made from metal, plastic, ceramic, or other suitable material. A small annular gap 58 exists between the outer surface of the sintered element 54 and the inner surface of the housing 56, and liquid "B" component flows through this annular gap. Air is supplied by the line 52 into the interior of the hollow sintered element 54 and permeates through the pores of the wall 60 thereof. Liquid "B" component flowing over the outer surface of the wall 60 weeps the air from the outer surface in the form of many small air bubbles, thus forming a fine-bubbled froth. The frothed "B" component is discharged from the exit nozzle 62. A static mixer (not shown) may be placed between the sintered element 54 and the nozzle 62 to provide further mixing and distribute the air bubbles more uniformly throughout the "B" froth, if desired. The volume within the dispenser 48 downstream of the sintered element 54 and upstream of the nozzle 62 is very small. Accordingly, virtually all of the "B" froth that is created is immediately dispensed.

Although the in-line froth generator of the type described above is preferred, it will be understood that the invention is not limited to methods and apparatus having such in-line froth generators, and other devices for generating a froth may be used, such as mechanical froth-generating devices.

Additionally, it has been discovered that, unexpectedly, a satisfactory "B" component froth is created with a dispenser such as the dispenser 48 having a sintered element as described above, even when the air supply through the line 52 is stopped, as long as the "B" component is heated to at least about 55° C. prior to being dispensed through the dispenser. While not wishing to be bound by theory, it is thought that air which is naturally dissolved in the liquid "B" component is liberated and forms air bubbles within the "B" component when the pressure of the liquid drops to atmospheric pressure at the dispenser exit (the pressure of the liquid "B" component entering the dispenser 48 being about 10–15 psig).

Various configurations of dispenser nozzles can be used with the methods and apparatus of the invention, including nozzles having circular shapes, oval or flattened circular shapes, and other configurations. A combined annular nozzle may also be used, wherein the precursors are dispensed from the nozzle as a thin annular stream of one of the precursors concentrically disposed radially inward of a thin annular stream of the other precursor. The two annular streams mingle and mix in free space, and may be impinged on a target if desired.

The configuration of the target is not critical to the production of satisfactory foam, and various target configurations may be used. For example, the target may comprise a flat plate or a non-flat plate such as a corrugated plate. The lower edge of the plate from which the precursors fall under gravity may be straight, angled, V-shaped, serrated, wavy, etc. Alternatively, the target may comprise a cylinder which is oriented with its longitudinal axis vertical and is rotated about its axis at an angular rate high enough to "smear" the precursors together and enhance mixing, but low enough to prevent the precursors from being slung off the cylinder. For example, where the precursor streams have a velocity of about 20–30 feet per second, the cylinder is rotated such that its peripheral speed is about 7 feet per second. The two precursor streams advantageously impinge on the cylinder from generally diametrically opposed directions, so that the cylinder acts as a shield between the two dispenser nozzles.

Figure 5:
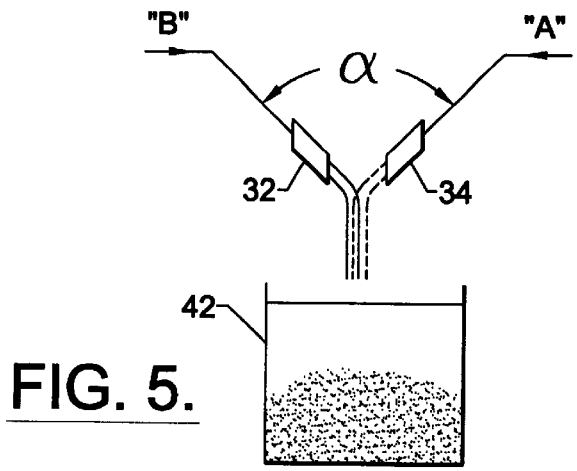
FIG. 5 is a schematic depiction of a further embodiment of the invention in which two precursor streams are impinged on each other without the aid of a target.

Although the embodiments of the invention described thus far have included targets upon which the precursor streams are impinged, it will be understood that the invention is not limited to methods and apparatus employing such targets, and satisfactory foam can be produced without any target or other mechanical intervention. For example, FIG. 5 depicts an apparatus in which the dispensers 32 and 34 are oriented to direct the streams of precursors to impinge on each other from two different directions such that there is an included angle α between the two streams. The streams mix sufficiently without mechanical intervention to produce acceptable foams for packaging purposes.

An unexpected advantage of the methods and apparatus of the invention is that satisfactorily uniform polyurethane foam can be produced over a significantly wider range of flow rate than is typically the case with a conventional process employing a static through-flow device for mixing the precursors. For example, it has been found that acceptable foams can be produced at flow rates from about one to about 10 pounds per minute.

EXAMPLES

A series of foam-making tests were performed to investigate the effects of various parameters on the quality of polyurethane foam produced by frothing one or the other, or both, of the "A" and "B" components and mixing the precursors to produce a series of foam samples. The "A" component comprised a polymeric polyphenylene polyisocyanate, and the "B" component comprised a polyoxyalkylated glycol. In an initial series of tests, the precursors were mechanically frothed using a hand blender, and 13.5 grams of the "A" component and 10.0 grams of the "B" component were combined in a standard container and were given a small amount of mechanical mixing by a standard procedure. The composition was allowed to react and cure to form a polyurethane foam sample. A series of samples was produced by varying void fraction of each frothed component. The total volume of each sample was measured. The results generally showed that frothing of the components prior to mixing substantially increases the volume of foam produced. From this initial test series, it was concluded that satisfactory quality foams can be produced from "A" component having about a 0–5 percent void fraction and frothed "B" component having about a 15 percent void fraction.

To investigate the practicality of externally mixing the precursors by dispensing them from nozzles and impinging them on each other and/or on a target, and to further investigate the effects of "B" component void fraction as well as other variables including nozzle and target geometry, further tests were performed. The "A" component was not frothed, and the temperature of the components was held fixed at about 55° C.

In the first series of tests of impingement mixing, void fraction of the "B" component was varied from zero to 17.2 percent. Two flat ribbon nozzles were used for dispensing the "A" and "B" components at flow rates of 1.49 $lb_m$/min and 1.11 $lb_m$/min, respectively such that they impinged on each other in free space (i.e., no target was used). The "A" component contained no silicone surfactant. The density of each foam sample was measured, and the color, cell size, and uniformity of the sample was non-quantitatively rated as either "good", "medium", or "poor". Color was rated as "good" if the foam had a white color, "poor" if the foam was yellow, and "medium" if the color was yellowish-white. The uniformity rating was based on whether the cell size and color were uniform throughout the foam sample. The cell size rating was qualitatively judged from the appearance of the foam, with "good" representing small cell size and non-glossy surface and "poor" representing large cell size and glossy surface. Results of the test series are tabulated in the following table.

| Effect of "B" Component Void Fraction | | | | |
|---|---|---|---|---|
| "B" Void Fraction (%) | Foam Density (g/cm³) | Color | Uniformity | Cell Size |
| 0.0 | 0.0055 | poor | good | poor |
| 9.9 | 0.0103 | medium | poor | medium |
| 15.5 | 0.0074 | medium | poor | medium |
| 15.5 | 0.0098 | medium | poor | medium |
| 17.2 | 0.0100 | medium | poor | medium |

A second series of tests was run using the same flat ribbon nozzle test setup without a target, to assess the effects of adding a small amount of silicone surfactant to the "A" component. In one test, 1.0 percent by weight of silicone surfactant was added to the "A" component, and void fraction of the "B" component was 12.5 percent. The resulting foam had a density of 0.0057 g/cm³, and foam quality was rated "good" in all three categories. Similar results were obtained for 2.0 percent silicone surfactant and 13.3 percent void fraction, and for 3.0 percent silicone surfactant and 19.0 percent void fraction. Thus, adding 1–3 percent by weight silicone surfactant has been found to be beneficial in producing good quality foam.

To assess the effects of nozzle and target geometries on foam quality, a series of tests was performed using flat ribbon nozzles without a target as well as with targets of various geometries. "A" and "B" component flow rates were maintained at 1.38 and 1.02 $lb_m$/min, respectively, component temperatures were 55° C., the void fraction of "B" was 15.7 percent, and 2 percent by weight silicone surfactant was added to the "A" component. FIGS. 6A–E depict the various targets used during the tests. The target shown in FIG. 6A comprised a flat plate of 0.005-inch thick stainless steel held equidistant from the exits of the two ribbon nozzles, similar to the arrangement shown in FIG. 2, and having a straight horizontal lower edge spaced 0.5 to 1.0 inch below the point at which the component streams impinged on the target. The target shown in FIG. 6B comprised a 0.005-inch thick stainless steel plate having an inverted V-shaped notch in its lower edge. The target shown in FIG. 6C comprised a 0.005-inch thick stainless steel plate having a downwardly narrowing V-shaped lower edge. The target shown in FIG. 6D comprised a corrugated stainless steel plate. Finally, the target shown in FIG. 6E comprised a circular cylinder having a diameter of 0.375 inch, which was oriented with its longitudinal axis vertical and was rotated about its axis at a speed of about 600 rpm.

Figure 6A:
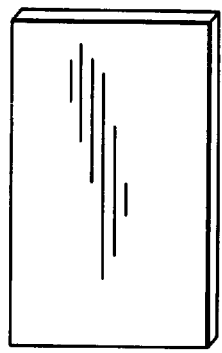
FIGS. 6A–6E depict various configurations of targets which are effective for use with the methods and apparatus of the invention.
Figure 6B:
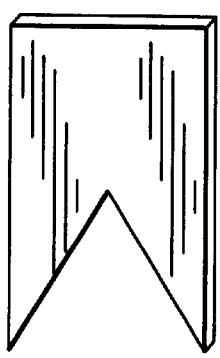
Figure 6C:
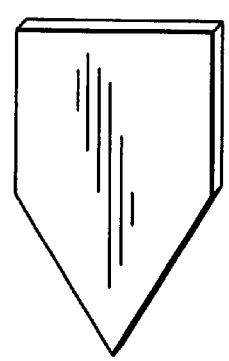
Figure 6D:
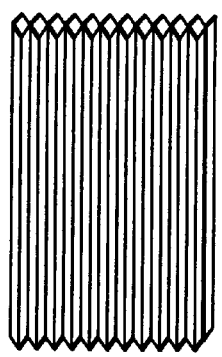
Figure 6E:

Each of the tests with and without targets resulted in foam samples rated "good" in all three categories, with the exception of the target shown in FIG. 6B having the inverted V-shaped notch in the lower edge, which produced foam rated "good" in both color and cell size but "medium" in uniformity. The foam densities ranged from 0.0066 g/cm³ with the target of FIG. 6A to 0.0112 g/cm³ with the rotating cylinder target of FIG. 6E. From these tests, it is concluded that foam quality is not particularly sensitive to the target geometry, and a wide variety of target shapes are likely to be usable for producing foam of acceptable quality and density for packaging purposes.

Test were also conducted using circular nozzles of 0.070-inch inner diameter at the nozzle exit with both the straight-edged plate of FIG. 6A and the rotating cylinder. The density and quality of foam produced were similar to those obtained with flat ribbon nozzles and the same targets.

From the foregoing, it will be appreciated that the invention provides a method and apparatus for making polyure-

What is claimed is:

1. A method of making polyurethane foam, comprising:

forming a first liquid precursor into a froth having a void fraction ranging from about 6 percent to about 16 percent, said first liquid precursor comprising a polyol;

next, directing a stream of the froth into a free space; and directing a stream of a second precursor comprising an isocyanate into the free space so as to contsct and mingle with the stream of froth in said free space without the assistance of a through-flow mixing chamber or device, the two streams being maintained separate from each other prior to being directed into the free space such that the streams first make contact and mingle with each other in the free space and thereby react to form a polyurethane foam at a flow rate ranging from about 1 to about 10 pounds per minute.

2. The method of claim 1, further comprising the step of mixing the second precursor in liquid form with a gas to form a froth prior to the step of directing the stream of the second precursor into the free space to contact and mingle with the froth stream of the first precursor.

3. The method of claim 1, further comprising the step of metering the liquid polyol-containing precursor to the first predetermined rate of flow prior to mixing the polyol-containing precursor with gas to form the froth.

4. The method of claim 3 wherein the polyol-containing precursor is mixed with air to form the froth.

5. The method of claim 4, further comprising the step of heating the two precursors prior to directing the streams of the precursors into the free space.

6. The method of claim 5, wherein the heating step comprises heating the precursors to a temperature of about 55–65° C.

7. The method of claim 4, wherein the step of mixing the polyol-containing precursor with air to form a froth comprises mixing air into the polyol-containing precursor to produce a void fraction of about 10 percent to about 14 percent.

8. The method of claim 4, wherein the step of mixing air into the polyol-containing precursor comprises using a sintered element to create and entrain air bubbles in the polyol-containing precursor.

9. The method of claim 4, wherein the step of directing the precursors into the free space comprises directing the frothed polyol-containing precursor and the second precursor against a target disposed in the free space such that the two precursors converge and impinge on the target and mix as they fall from the target under the influence of gravity.

10. The method of claim 4, wherein the step of directing the precursors into the free space comprises directing streams of the frothed polyol-containing precursor and the second precursor to impinge on each other and mix without mechanical intervention.

11. The method of claim 4, further comprising the step of adding a silicone surfactant to the second precursor prior to directing a stream of the second precursor into the free space to contact and mingle with the polyol-containing precursor.

12. A method of making a polyurethane foam comprising:

forming a polyol-containing precursor into a froth having a void fraction ranging from about 6 percent to about 16 percent;

next, directing a stream of the froth into a free space and against a target disposed in the free space; and directing a stream of an isocyanate-containing precursor into a free space and against the target, said target providing a mechanical intervention upon which both streams impinge, the streams falling together from the target under the influence of gravity and mixing as they fall in said free space without the assistance of a through-flow mixing chamber or device, the two streams being maintained separate from each other prior to being directed into the free space such that the streams first make contact and mingle with each other in the free space, whereby the polyol-containing precursor and the isocyanate-containing precursor mix sufficiently and react to form a polyurethane foam at a flow rate ranging from about 1 to about 10 pounds per minute.

13. The method of claim 12 wherein the two streams impinge on opposite sides of the target adjacent a lower edge thereof, the two streams then falling together under the influence of gravity and mixing as they fall together from the lower edge of the target.

14. The method of claim 12 wherein the two streams impinge on the same side of the target at impingement points that substantially coincide.

15. The method of claim 12 wherein the polyol-containing precursor is directed at the target by a polyol dispenser, and wherein the step of forming the polyol-containing precursor into a froth occurs within the polyol dispenser.

16. The method of claim 12 wherein the step of forming the polyol-containing precursor into a froth comprises using a sintered element to create and entrain air bubbles in the polyol-containing precursor.

17. The method of claim 12, further comprising the step of heating the two precursors to a temperature of about 20° C. to about 85° C. just prior to mixing the precursors together.

18. The method of claim 12, further comprising the step of heating the two precursors to a temperature of about 55° C. to about 65° C. just prior to mixing the precursors together.

* * * * *